A. C. PRATT.
GROMET OR TIRE BEAD AND METHOD OF MAKING THEM.
APPLICATION FILED MAR. 25, 1919.
1,334,635.
Patented Mar. 23, 1920.
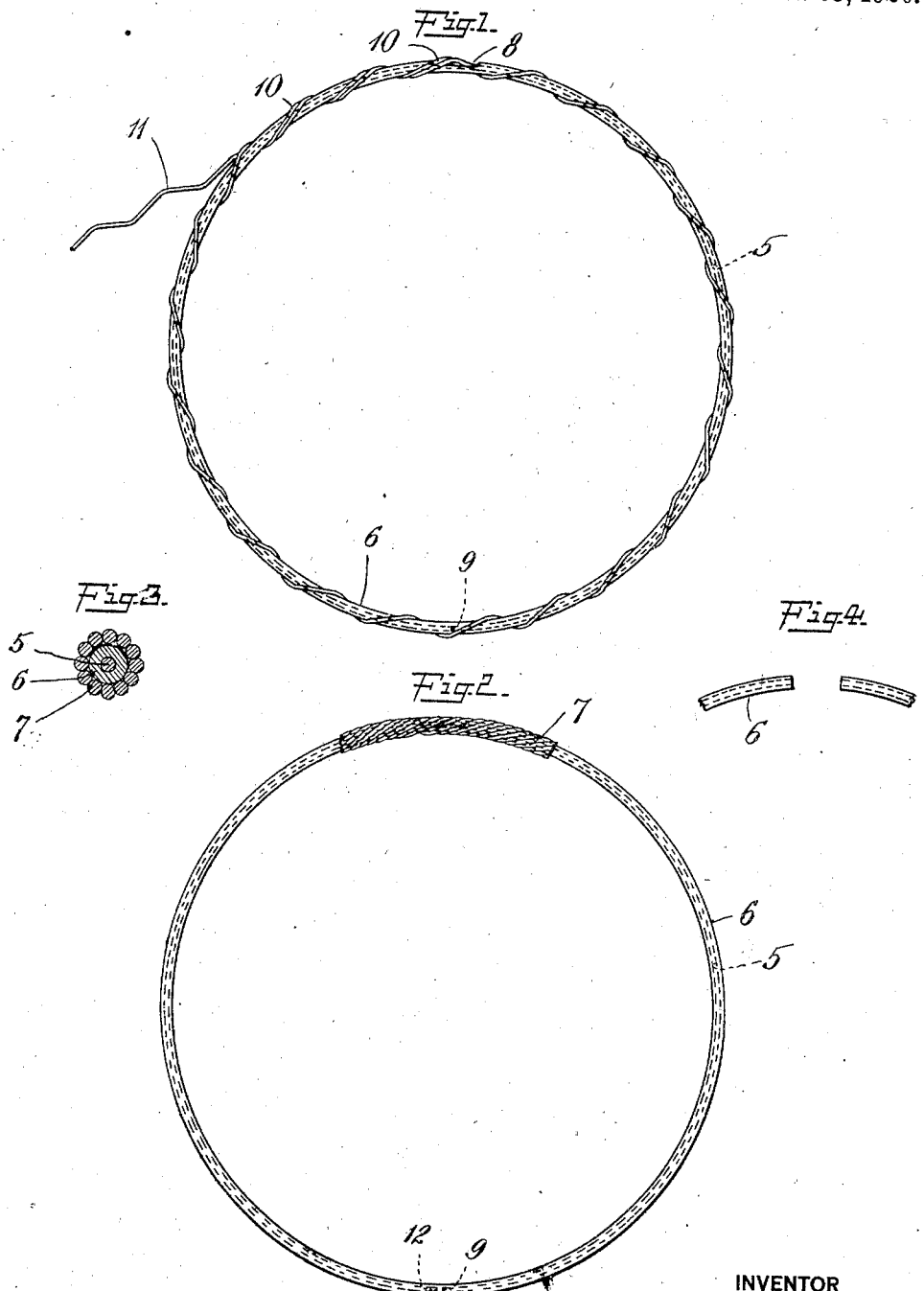

UNITED STATES PATENT OFFICE.

ALPHONSO COMSTOCK PRATT, OF DEEP RIVER, CONNECTICUT

GROMET OR TIRE-BEAD AND METHOD OF MAKING THEM.

1,334,635.  Specification of Letters Patent.  Patented Mar. 23, 1920.

Application filed March 25, 1919. Serial No. 285,122.

*To all whom it may concern:*

Be it known that I, ALPHONSO COMSTOCK PRATT, a citizen of the United States, residing at Deep River, in the county of Middlesex, State of Connecticut, have invented certain new and useful Improvements in Gromets or Tire-Beads and Methods of Making Them; and I do hereby declare the following to be a full, clear, and exact description of the invention, such as will enable others skilled in the art to which it appertains to make and use the same.

This invention relates to gromets or tire beads for use in the manufacture of automobile tires, more particularly tires of the so-called "straight side" type. The invention is directed to the provision of a tire of an improved construction, the special object of the improvement being to secure greater strength.

A gromet for an automobile tire as heretofore commonly constructed is a hoop of stranded steel wire consisting of a core and a surrounding casing of wires which are spirally formed. Usually the core consists of a single strand of wire and the surrounding casing consists of six convolutions of a wire wound spirally on the core with the spirals of the several convolutions lying side by side. The core may be made from a piece of wire separate from the surrounding casing in which case it is usually made by bending a length of wire to the form of a hoop and welding or otherwise securing its ends together. The surrounding casing is also made from a continuous length of wire and this piece of wire may be a continuation of the piece which forms the core.

In accordance with the present invention, a gromet of a greatly increased strength is provided and the process of manufacturing is greatly facilitated by employing a tube in the core of the gromet which tube not only contributes materially to the strength of the completed gromet, but also serves as a casing for a core wire which is inserted within the tube and preferably fills the entire interior of the tube. The completed gromet comprises a core consisting of a central core wire, a tube surrounding this wire and a casing inclosing this tube consisting of a plurality of convolutions of spiral wire with the spirals of the several convolutions lying side by side so that they form a complete inclosing casing for the interior core.

The method of manufacture which is preferred involves as the first step the provision of a tube which is bent to the form of a hoop, the hoop being complete except for an opening at a suitable point for the insertion of the core wire into the interior of the tube. The tube may be bent to almost a complete circle, leaving a small space between its ends, or if desired the circle of the tube may be complete, the ends of the tube being welded together, and an opening may be cut in the side of the tube for the insertion of the core-wire. This having been done, the core-wire is inserted into the interior of the tube and passed around within the tube about half way around the circle of the tube. Then the portion of the wire adjoining this part which extends within the core-tube is wound spirally upon the tube, several convolutions of the wire being wound on the tube with the spirals of the several convolutions lying side by side until the entire surface of the tube is covered by the spirals. When the last convolution of the spiral winding has been completed, the wire is cut at a point which allows enough beyond the end of the last convolution of spirals for the completion of the core-wire within the core-tube. This end of straight wire is then inserted into the core-tube and passed around within that tube until its end abuts or practically abuts against the end of the wire which was first inserted. This method results in the production of a gromet consisting of a core formed by a core-wire inclosed within a tube and a casing of spirals lying side by side wound on this core. The complete gromet consists of a single piece of wire and a tube for the core-wire, the spiral winding and the core-wire being continuous from end to end. One end of this continuous piece of wire forms half of the core-wire of the gromet, the other end constitutes the other half of the core-wire of the gromet and the portion of this continuous piece of wire intermediate its ends is utilized for the several convolutions of spirals inclosing the composite core.

The embodiment of the invention which is preferred is illustrated in the accompanying drawings in which Figure 1 is an elevation of the gromet in course of manufacture; Fig. 2 is an elevation of the completed gromet; Fig. 3 is a transverse section of the gromet; and Fig. 4 is a detail view illustrating a slight modification of the construction shown in Fig. 1.

Referring to these drawings, the gromet as shown in Fig. 3 has a core consisting of a core wire 5 and a core tube 6 inclosing the wire 5 and on this composite core is a casing of wires 7 lying side by side, these wires being spirally formed and having the spirals lying side by side and the number of wires being sufficient to completely inclose the core.

In making a gromet of this construction, the first step is to prepare the core tube 6. This tube is made from a piece of seamless steel tubing which is bent to circular form. If desired, the circle of this core tube may be incomplete leaving a small space between the ends of the tube as is indicated in Fig. 4. Instead, however, the circle of the core tube may be completed by bringing the ends of the core tube together and securing them together in any suitable manner as by welding or the like; in this case an opening in the side of the tube is provided at a suitable point, such for instance as the opening which is indicated at 8 in Fig. 1, formed by cutting away the side of the tube for a short distance. The core tube having been prepared in this manner, the end of a piece of wire is inserted within the core tube and passed around about one-half of the circumference of the tube. With the construction shown in Fig. 4, the wire is forced into one end of the core tube 6, and with the construction shown in Fig. 1, it is passed into the interior of the tube through the opening 8. The interior of the core tube is of substantially the same size as the wire so that the wire makes a snug fit within the tube. In Fig. 1, the wire is shown as extending half way around the circumference of the core tube, its end being indicated at 9. This having been done, the wire beyond the part which has been threaded into the interior of the core tube is wound spirally upon the core tube. A plurality of convolutions of the spirals are wound upon the core tube, the successive spirals of the same convolution being spaced apart such a distance circumferentially of the gromet that when the requisite number of convolutions have been wound upon the core, the spaces between adjacent spirals of the first convolution will be completely filled and a casing completely inclosing the core will be formed. In Fig. 1, a portion of the second convolution is shown at 10 as applied to the core of the gromet. In the construction illustrated, the wire is shown at 11 as having a spiral configuration imparted to it before it is wound upon the core in accordance with the invention described and claimed in Patent No. 1,294,160 heretofore granted to me, but if desired, the wire 11 may be a straight wire and the spiral configuration may be imparted to it as an incident to its application to the core. In either event, the several convolutions of spirals, eight as shown in Fig. 3, are applied to the composite core until the core is completely inclosed within the casing of spirals as is indicated in Fig. 2. Then the continuous piece of wire forming the core-wire and the spiral winding is cut at a point which will allow beyond the end of the spiral winding a length sufficient to complete the core wire. This end beyond the end of the spiral winding is then inserted and moved along within the interior of the core-tube in the direction opposite to the direction of movement of the portion 9 of the core wire initially inserted within the core tube. This last end of the core wire is moved around until all of it has passed into the interior of the core tube and it is preferably of such a length that its end 12 is close to or in contact with the end 9 initially inserted. For the purpose of facilitating the entrance of this end of the core wire into the core tube, two of the spirals of the spiral winding overlying the opening in the core tube 6 may be moved apart slightly. After the gromet has been completed in accordance with the procedure above outlined, it is placed upon an expanding device for expanding it within a die ring to insure that it will be of the exact size desired. When it is subjected to pressure for this purpose, the metal throughout all parts of the gromet yields to the tremendous strain but there is no danger that the parts of the core wire will slip out of the interior of the core tube.

A gromet constructed as above described will possess great strength as compared to the types of gromets which have heretofore been employed in automobile tires. Furthermore, the procedure above outlined in the manufacture of the gromet, is one which may be practised conveniently and economically so that the cost of production of the improved gromets will compare favorably with those of less desirable constructions.

What I claim is:

1. A gromet having a core consisting of a tube and a wire within the tube and a spiral winding applied to the core.

2. A gromet having a core consisting of a tube and a wire inclosed within the tube and a casing inclosing the core and consisting of a plurality of convolutions of spiral wire having the spirals of the several convolutions lying side by side entirely around the core.

3. A gromet having a core which includes a tube and a spiral winding upon the surface of the core, either or both ends of the spiral winding being inserted within the core tube.

4. A gromet having a core which includes a tube, and a surrounding casing consisting of a plurality of convolutions of spiral wire applied to the core with the spirals of the several convolutions lying side by side entirely around the core, the casing being formed from a continuous piece of wire and the ends of this continuous piece being inserted within the tube of the core.

5. A gromet having a core which includes a tube bent to the form of a hoop and having an opening leading to the interior thereof and a single piece of wire having its end portions inserted through said opening and into the interior of said tube to substantially fill the interior of the tube and having the portion of the wire intermediate these end portions forming a casing on the core consisting of a plurality of convolutions of spiral wire with the spirals of the several convolutions lying side by side upon the core entirely around the core.

6. The method of making a gromet which consists in bending a tube to the form of a hoop, inserting the end of a wire into the tube and then winding the wire whose end is so inserted spirally upon the core formed by the tube and the wire inclosed therein.

7. The method of making a gromet which consists in bending a tube to the form of a hoop, inserting the end of a piece of wire within this hoop so that it fills a portion of the interior thereof, then winding the wire whose end is so inclosed within the tube spirally upon the tube to form a plurality of convolutions extending around the circumference of the tube with the spirals of the several convolutions lying side by side and then inserting the end of the wire from which the spiral winding was formed within the tube.

In testimony whereof I affix my signature.

ALPHONSO COMSTOCK PRATT.